Dec. 22, 1964  J. M. PERKINS  3,162,103
PHOTOGRAPHIC METHOD FOR LOCATING OBJECTS ADRIFT AT SEA
Filed Oct. 26, 1961

INVENTOR.
JAMES M. PERKINS
BY
ATTORNEY

United States Patent Office 3,162,103
Patented Dec. 22, 1964

3,162,103
PHOTOGRAPHIC METHOD FOR LOCATING
OBJECTS ADRIFT AT SEA
James M. Perkins, 425 E. Hemlock St., Oxnard, Calif.
Filed Oct. 26, 1961, Ser. No. 148,002
8 Claims. (Cl. 95—1)
(Granted under Title 35, U.S. Code (1952), sec. 266)

The invention described herein may be manufactured and used by or for the Government of the United States of America for governmental purposes without the payment of any royalties thereon or therefor.

This invention relates to methods for locating objects adrift at sea, and more particularly to such a method that utilizes high-altitude photographic means to accurately locate the objects to be sought.

The problem of searching vast bodies of water for objects and survivors has existed from the early days of sailing vessels. The space age has created another requirement for an improved method of locating and recovering the capsules of space vehicles which contain valuable data and/or the occupant in the case of manned vehicles.

At the present time there are several systems employed for locating objects adrift at sea. The most common method relies on visual observation by observers on ships or aircraft, assisted by the use of flares, etc. The obvious disadvantages of visual observation are the limitation of extremely short range, the possibility of human error, and the dependability on good weather and calm seas. A comparatively recent method utilizes the installation of radio transmitters on the object adrift that is energized upon impact with the water. The ship or aircraft then makes an electronic search by homing on the source of the transmitted signal. While the range is substantially increased over the visual observation system, nevertheless, it is limited for aircraft to about 100 miles and limited for surface vessels to about 10 miles. The electronic search system presents the danger of a loss of power or a malfunction in the radio beacon which is located on the downed capsule. It should be noted that both the visual and electronic search methods require at least several search vessels and aircraft for long periods of time with resulting high fuel and operating costs and in many instances with less than satisfactory results.

The method of the present invention avoids many of the aforementioned disadvantages of the prior search methods, and while the photographic method may not replace such systems, it at least does provide an excellent backup system. In essence, the method locates, in a given sector, the search vessels and an object to be recovered by emitting from each an identifiable energy source, and by photographing said sector from a high altitude to produce images of said objects on a photosensitive recording medium which will be affected by such energy source. Such energy source could be a dye, a light source, an infrared source, an electromagnetic source and others. The invention contemplats the use of a rocket for elevating the camera or the like to the desired altitude depending on the area of the sector to be recorded.

One object of the present invention is to provide a more reliable and accurate method for locating an object.

Another object is to provide such a method which reduces the total number of aircraft and/or surface vessels that need be involved in any search.

Still another object is to provide a more expeditious method of locating an object.

Other objects and many of the attendant advantages of this invention will be readily appreciated as the same become better understood by reference to the following detailed description when considered in connection with the accompanying drawings wherein.

Figure 1:
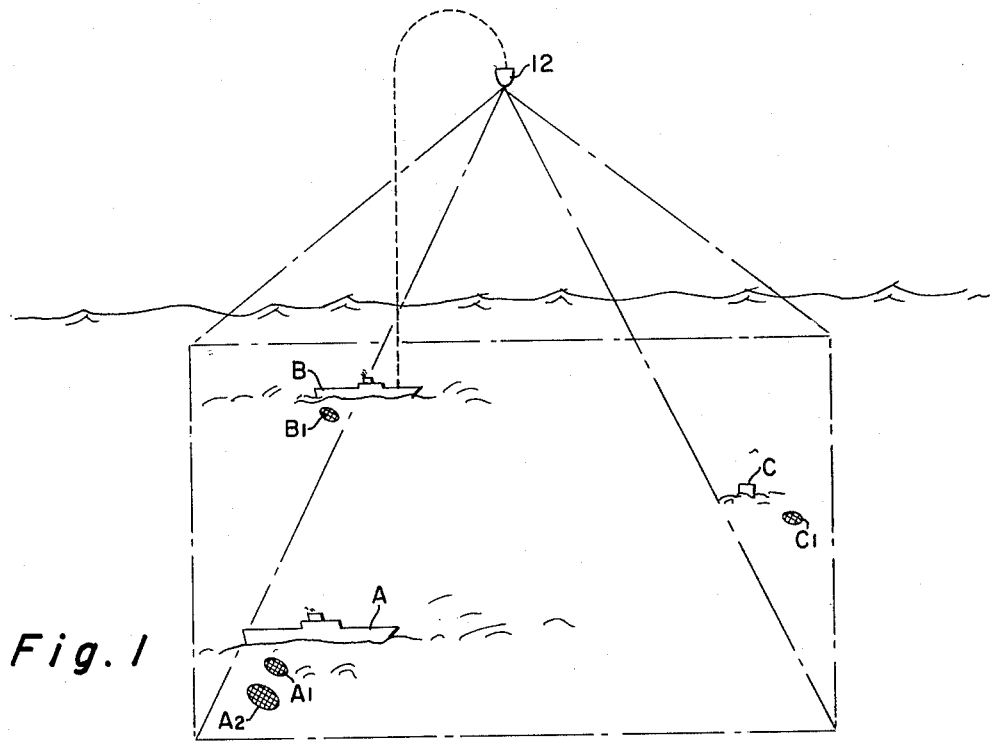
FIG. 1 is an aerial view of a recovery area on a large body of water showing the disposition of two search vessels and the unknown position of an object to be recovered, each having deployed a large sea dye marker on the surface of the water.

Referring to the drawing where like reference numerals refer to similar parts throughout the figures, there is shown in FIG. 1 an aerial view of two search vessels A and B, having known positions of longitude and latitude, and a floatable object C to be recovered, which can be a re-entry vehicle or nose cone, a raft containing survivors, or the like.

Where the method is employed for re-entry vehicles the vessels are located in the approximate recovery area prior to the impact of the re-entry nose cone or the like. At the approximate time of nose-cone impact vessel A deploys two sea dye markers A1 and A2 at one-half mile intervals and vessel B deploys one sea dye marker B1. Upon impact with the water, the nose cone deploys a single sea dye marker C1. Thus four sea dye markers are deployed on the surface of the water in any conventional manner. These sea markers can employ the conventional Navy fluorescein dye used on life rafts and life preservers, which dye uniformly spreads over a large surface area of the water. For the particular example described, the dye markers are light in weight and can produce a dyed area not less than 500 square feet for a 12 hour period.

To carry out the method, it is necessary to obtain a photograph of the recovery area showing the disposition of the sea dye markers so that the bearing and distance of the nose cone from both vessels can be ascertained by simple triangulation to effect an expeditious recovery. Such a photograph can be obtained by a high-flying aircraft balloon, or a rocket vehicle, the latter being preferred because there is no limitation as to height enabling the photograph to be taken at elevations not possible for manned aircraft. In the preferred embodiment a rocket vehicle 10 is employed which can be fired from either search vessel A or B. Vehicle 10 comprises a recoverable capsule 12 connected to the rocket motor 14 by a separation device 16.

Capsule 12 is designed to be aerodynamically stable in flight and includes a camera 18, a power supply 20 and a recovery system 22. The recovery system is deployed just prior to capsule impact with the water to prevent damage of the equipment enabling a rapid descent. The recovery system may include a small parachute or a drag plate that will provide a water impact velocity of the capsule of about 150 f.p.s. Camera 18 may be a 70 mm. camera, such as a Navy Model P2, having a narrow band pass interference filter 24. The filter absorbs the light reflected from the ocean and transmits light rays from the fluorescein dye in the sea marker for more clearly recording the dye markers on the water. The fluorescein dye may have a narrow band of wave length from 5000 to 5400 angstrom units, while filter transmits light from 5150 to 5250 angstrom units. Upon development, or, in the case of a Polaroid camera, removal of the film, the total impact area is recorded showing the four dye markers. The capsule can be serviced and reused.

In the event recovery is to be conducted in darkness, a suitable light source can be provided for the object and on the vessel a conventional searchlight could be employed instead of the sea dye markers. Similarly, to provide an all-weather capability infrared or electromagnetic sources can be used in lieu of the dye or light source and the camera designed to record the radiation sources. Thus the term "photographic" is intended in this application to mean the obtaining of a record of any type of said energy sources.

The search operation can be simplified and reduced to one large serach vessel by replacing vessel B with another type of vessel, such as a dye dispensing buoy (not shown) controlled from vessel A. Likewise, if a land mass is within the impact area for use as a reference point, the search operation can be conducted with one recovery ship.

Figure 2:
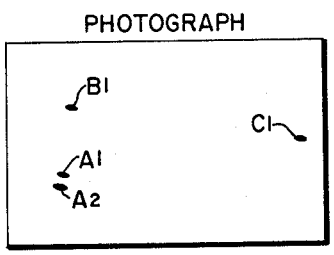
FIG. 2 is a reduced plan view of an aerial photographic film of FIG. 1 showing the images of the sea dye markers corresponding to the vessels and the object.
Figure 3:
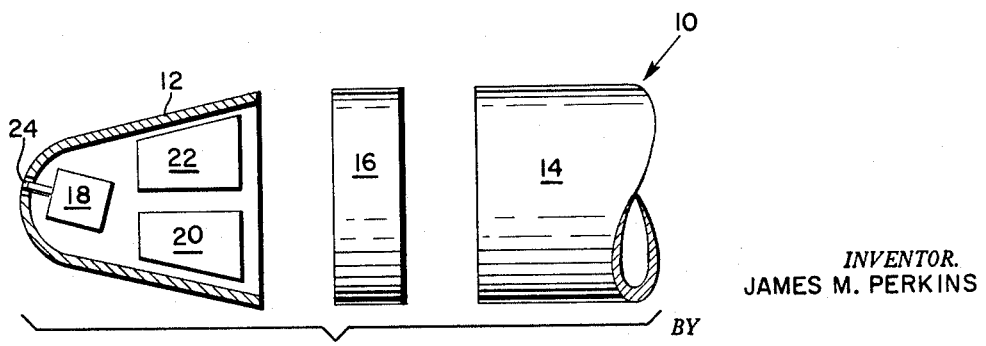
FIG. 3 is a partial exploded cross-section view of a missile for elevating a camera to obtain the photographic film of FIG. 2.

The photographic search operation shown in FIGS. 1–3 is conducted in the following manner. Ships A and B are deployed a known distance apart in the recovery area prior to the impact of nose cone C. At the approximate time for nose-cone impact, vessel A deploys two sea dye markers A1 and A2 at one-half mile intervals, while vessel B deploys one sea dye marker B1. Upon impact of the nose cone it automatically deloys a sea dye marker which could be of a smaller size. Approximately 10 minutes after nose-cone impact, recovery vessel A launches rocket 10 in a vertical trajectory to an altitude of approximately 50 miles. After capsule 12 separates and at a predetermined altitude, camera 18 takes a picture of the entire impact area containing the four sea dye markers. The capsule continues its downward flight until prior to impact when a parachute or a drag plate deploys to prevent damage to the equipment, the total flight time being about 8 minutes. Since the trajectory is substantially vertical the capsule impacts in close proximity to vessel A to enable the capsule to be quickly recovered, the nose cone being sufficiently buoyant without the need for a flotation system. Upon recovery the film is developed. The film (FIG. 2) will record the four sea dye markers, recovery vessel A being identified by the two dots being images of A1 and A2, vessel B by the single dot and nose cone C by the smaller dot. By simple triangulation the range and bearing of floating capsule C can be determined from either recovery ship.

In the event of a malfunction in any component of recovery capsule 12, sufficient time remain to launch a second or third rocket.

Although the capsule is disclosed as falling uncontrolled, a suitable radio homing guidance and control system could be incorporated with suitable provision for control surfaces on the exterior of the nose cone. Such a guidance and control system would appreciably increase the recovery system's reliability and reduce the time required for the operation.

The recovery system of this invention provides a quicker and less costly method of retrieving objects adrift at sea and reduces the likelihood of additional casualties of searching aircraft. The system provides an all-weather capability in an environment not possible with conventional search systems.

Although the method illustrated photographs the survey area on the descent phase of the rocket trajectory, if desired the rocket could be designed so that the camera take the photograph on the rocket ascent phase. In addition, the camera can be canted from the longitudinal axis of the capsule to take advantage of the spin rate of the capsule to scan a large surface area.

Obviously many modifications and variations of the present invention are possible in the light of the above teachings. It is, therefore, to be understood that, within the scope of the appended claims, the invention may be practiced otherwise than as specifically described.

I claim:

1. A method of obtaining a pictorial representation from which the location of an object on the surface of a given search area in relation to two known points may be determined, which includes the steps of deploying from each of said points and from said object a defined source of energy distinguishable from the background surface, at least one source of energy from said points being distinguishable from the other, and subjecting said search area to a recording medium sensitive to said energy source at an elevation above the surface sufficient to encompass said search area, whereby recordable images of said energy sources are obtained from which the range and bearing of said object from said points can be ascertained.

2. A method of locating an object adrift on the surface of a given search area in the sea in relation to two known points, at least one of said points being a search vessel, which includes the steps of deploying from said points and from said object a defined source of energy distinguishable from the background surface, the sources of energy from said points being distinguishable from each other, propelling a recording medium from said vessel to an elevation above said surface sufficient to encompass said search area, and subjecting said search area to the recording medium sensitive to said energy source, and recovering said recording medium, and calculating the position of the object in the search area by means of triangulation from the recorded images of said energy sources on the recording medium.

3. The method in claim 2 wherein each source of energy is a light source, and the recording medium is a photographic film.

4. The method of claim 2 wherein each source of energy is a short wave-length electromagnetic radiation.

5. A method of locating an object adrift on the surface of a large body of water within a given search area in relation to two known points, at least one of said points being a search vessel, which includes the steps of deploying from said points and from said object a defined source of energy distinguishable from the background surface, the sources of energy from said points being distinguishable from each other, launching a missile from said vessel containing a recording medium sensitive to said energy source, recording the disposition of said sources of energy on said recording medium at an elevation above the surface sufficient to encompass said search area and recovering said recording medium, and calculating the position of the object in the search area by means of triangulation from the recorded images of said energy sources on the recording medium.

6. The method of claim 5 wherein another of said points is a buoy.

7. A method of locating a re-entry object adrift on the surface of a large body of water within a given search area in relation to two vessels having known positions, which includes the steps of deploying from said vessels and from said object a defined source of energy distinguishable from the background surface substantially at the time of the re-entry impact with the water, the sources of energy from said vessels being distinguishable from each other, launching a missile from one of said vessels containing a recording medium sensitive to said sources of energy, recording the disposition of said energy sources on said recording medium at an elevation above the surface sufficient to encompass said search area and recovering said recording medium, and calculating the position of the object in the search area by means of triangulation from the recorded images of said energy sources on the recording medium.

8. The method of claim 7 wherein said missile comprises a recoverable capsule containing a camera and a parachute.

No references cited.